Figure 1:
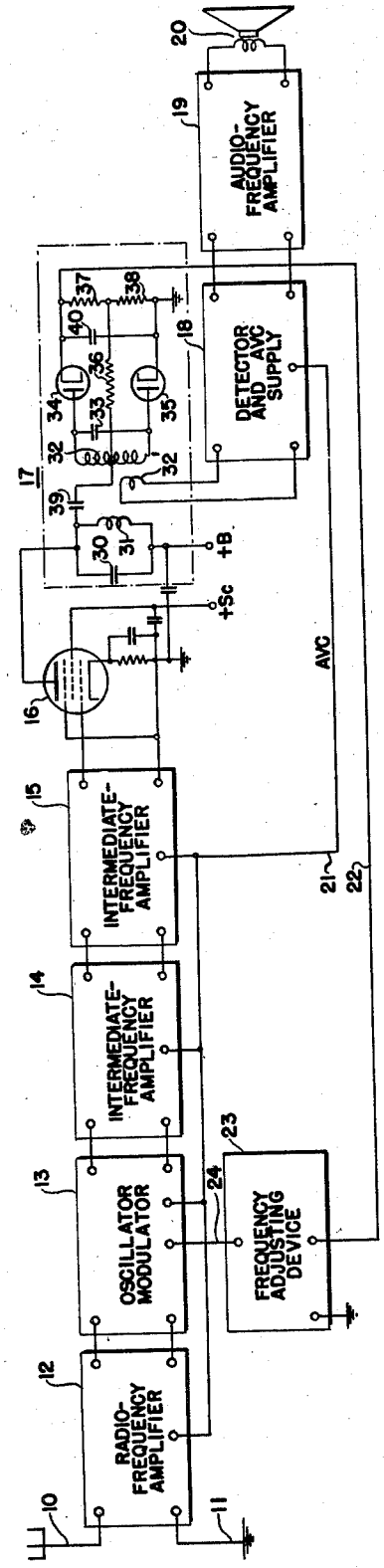

Dec. 19, 1939.   R. L. FREEMAN   2,184,072
FREQUENCY-RESPONSIVE NETWORK
Filed Sept. 20, 1938

INVENTOR
ROBERT L. FREEMAN
BY Lawrence B. Dodds
ATTORNEY

Patented Dec. 19, 1939

2,184,072

UNITED STATES PATENT OFFICE 2,184,072

FREQUENCY-RESPONSIVE NETWORK

Robert L. Freeman, Great Neck, N. Y., assignor to Hazeltine Corporation, a corporation of Delaware

REISSUED
JAN 14 1941

Application September 20, 1938, Serial No. 230,820

12 Claims. (Cl. 250—20)

The present invention relates to an improved frequency-responsive network and particularly to such a network adapted to be utilized in an automatic-frequency control system of a modulated-carrier signal-translating apparatus, the frequency-responsive network of the invention having a relatively limited response range but having a relatively high sensitivity over the range. As used in this specification, the terms "relatively limited response range" and "limited frequency range" refer to a range of frequencies which is narrow relative to the mean frequency of the range.

One type of frequency-selective network which has previously been used in automatic-frequency control systems utilizes the principle of rectifying separately the sum and the difference of the voltages existing across the primary and secondary windings of a double-tuned circuit and differentially combining the rectified voltages so obtained to provide a voltage varying in magnitude and polarity with deviations of the frequency of the signal input to the system from its mean or normal value. A disadvantage of such an arrangement is that with usual design of signal-translating and control circuits and at usual signal frequencies, the magnitude of the output of each of the rectifiers varies quite gradually and over a considerable frequency range. Thus, the difference of the rectified voltages also varies gradually with respect to frequency, decreasing the sensitivity of the system, and between maximum and minimum values which are relatively remotely separated, permitting the control to extend over adjacent signal channels, effectively blanking them out.

It is an object of the invention, therefore, to provide a frequency-responsive network which overcomes the above-mentioned disadvantages of such arrangements of the prior art.

It is a further object of the invention to provide a frequency-selective network operable over a narrow frequency range at the frequencies commonly utilized in the intermediate-frequency channel of superheterodyne receivers.

It is still another object of the invention to provide a frequency-responsive network operable over a relatively narrow frequency range and having a relatively high sensitivity over the range.

In accordance with the invention, a frequency-responsive network comprises an input circuit to which is coupled means for deriving a first voltage and means for deriving a second voltage variable in phase with frequency over the operating range of the system with respect to the first voltage. Two rectifiers are provided together with means for applying to one of the rectifiers the sum and to the other of the rectifiers the difference of the two derived voltages, and means for applying an amplitude delay bias to each of the rectifiers derived from the applied voltages. Each of the biases is sufficient to reduce the output of the rectifier to which it is applied to substantially zero at a frequency in the immediate vicinity of the mean resonant frequency of the operating range. Means are provided for deriving an output from the system which varies in accordance with the voltages developed by the rectifiers.

In a preferred embodiment of the invention, the means of obtaining the two derived voltages, the relative phase of which varies, comprises inductively-coupled tuned circuits, one of the voltages being that across the primary tuned circuit and the other being that across the secondary tuned circuit. Also in accordance with a preferred embodiment of the invention, the above-mentioned rectifiers are of the diode type and have individual load circuits including a common load impedance and individual load impedances, the value of the individual impedances being smaller than that of the common impedance. In this embodiment, the common impedance comprises the means for developing the delay biases, a bias being developed thereacross by each of the rectifier circuits and applied to the other rectifier.

In another embodiment of the invention the rectifiers are of the triode type and the mutual delay biases are developed by self-rectification in the grid circuits of the rectifiers.

Figure 4:
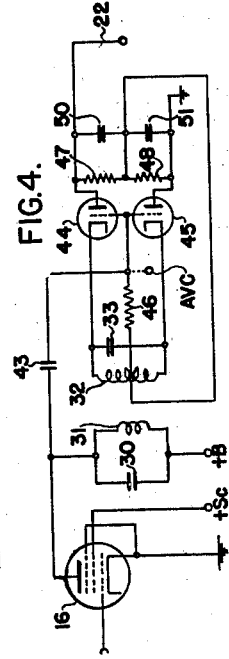
Figure 3:
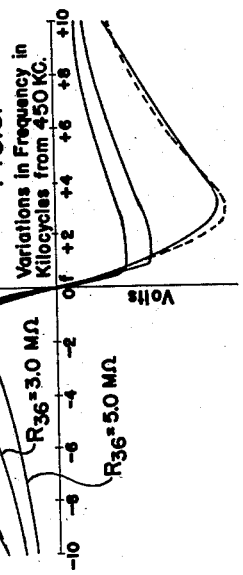
Figure 2:
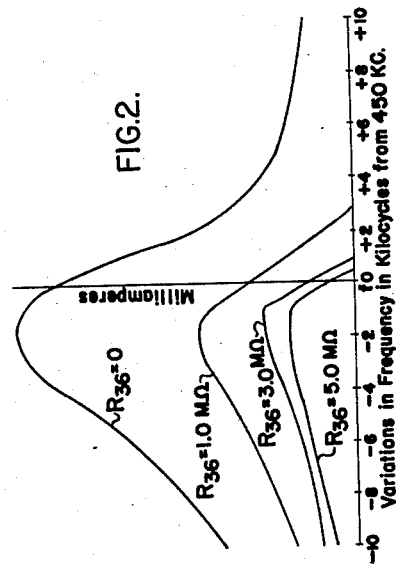

The novel features which are believed to be characteristic of this invention are set forth with particularity in the appended claims. The invention itself, however, both as to its organization and method of operation, together with further objects thereof, will best be understood by reference to the specification taken in connection with the accompanying drawing in which Fig. 1 is a circuit diagram, partly schematic, of a complete superheterodyne receiver including an automatic-frequency control system embodying the present invention; Figs. 2 and 3 illustrate certain of the operating characteristics of the circuit of Fig. 1; and Fig. 4 illustrates a different embodiment of a frequency-responsive network constructed in accordance with the invention.

Referring to Fig. 1 of the drawing, there is shown a circuit diagram, partially schematic, of a complete modulated-carrier signal receiver of the superheterodyne type embodying the invention. This receiver comprises, in cascade, an antenna-ground circuit 10, 11, a radio-frequency amplifier 12, a frequency changer or oscillator-modulator 13, intermediate-frequency amplifiers 14 and 15, another stage of intermediate-frequency amplification comprising a vacuum tube 16 and a frequency-responsive selector network 17, a detector and automatic amplification control or A. V. C. supply 18, an audio-frequency amplifier of one or more stages 19, and a sound reproducer 20. Automatic amplification control is secured in a well-known manner by a unidirectional bias voltage derived from the A. V. C. supply 18 and applied over conductor 21 to the control electrodes of one or more of the tubes included in radio-frequency amplifier 12, oscillator-modulator 13, and intermediate-frequency amplifiers 14 and 15. Automatic-frequency control is secured in a well-known manner by applying a unidirectional voltage, derived from frequency-responsive network 17 in a manner to be described in detail hereinafter, over conductor 22 to a frequency-adjusting device 23 which, in turn, is coupled to the oscillator section of oscillator-modulator 13 by means of a conductor 24. All of the elements or assemblies illustrated in schematic form may be of suitable conventional construction and arrangement.

Neglecting for the moment the operation of that part of the system embodying the present invention, the circuit described constitutes, in general, a conventional superheterodyne receiver including automatic volume control and automatic-frequency control systems, the operation of such a receiver being well understood in the art. In brief, signals intercepted by antenna-ground circuit 10, 11 are selected and amplified in radio-frequency amplifier 12 and translated to oscillator-modulator 13 wherein they are converted to an intermediate-frequency signal. The intermediate-frequency signal is selectively amplified in intermediate-frequency amplifiers 14, 15 and 16 and delivered to the detector 18 wherein the audio-frequency signals and the A. V. C. biasing potentials are derived. The audio-frequency signals are in turn amplified by audio-frequency amplifier 19 and supplied to sound reproducer 20 for reproduction. The automatic-amplification control bias derived from unit 18 is effective to control the amplification of one or more of the units 12, 13, 14 and 15 to maintain the signal input to the detector 18 within a relatively narrow range for a wide range of received signal intensities, while the automatic-frequency control bias derived from unit 17 is effective to control the frequency-adjusting device 23 to maintain the frequency of the signal input to the detector 18 at a substantially constant value.

Referring now more particularly to the circuit of the invention for deriving a potential automatically to control the tuning of the receiver, the frequency-responsive network 17 comprises a primary tuned circuit including a condenser 30 and an inductance 31 inductively coupled to an inductance 32 of a secondary circuit tuned by condenser 33. Circuits 30, 31 and 32, 33 are tuned to the normal intermediate frequency of the receiver. The input to detector 18 is derived from a circuit including an inductance 32' inductively coupled to inductance 32. Network 17 also includes diode rectifiers 34 and 35 to which are respectively applied the sum and the difference of the voltage across the primary tuned circuit 30, 31 and the voltage across half the secondary tuned circuit 32, 33. Rectifiers 34 and 35 comprise individual load circuits having a common impedance, shown as a resistor 36, and individual impedances, shown respectively as resistors 37 and 38. To this end, resistor 36 is connected between the common terminal of resistors 37 and 38 and a mid-tap on inductance 32, while a coupling condenser 39 is connected between the high potential side of tuned circuit 30, 31 and the mid-tap on inductance 32. A by-pass condenser 40 is connected across load resistors 37 and 38 in series. As explained further hereinafter, the value of resistor 36 should be at least of the same order of magnitude as, preferably several times greater than, that of resistors 37 and 38.

In considering the operation of the circuit just described, it will be seen that, neglecting resistor 36, the frequency-selective network 17 is in general similar to conventional frequency-responsive networks utilizing the principle of rectifying separately the sum and difference of the voltages across the primary and the secondary of a double-tuned circuit and combining differentially the rectified voltages so obtained to provide a voltage varying in magnitude and polarity with the frequency applied to the system. For a complete explanation of the effect of resistor 36 on the characteristics of the frequency-responsive network 17, reference is made to Fig. 2 in which the curves represent the unidirectional output current of one of the rectifiers, for example diode 34, as a function of frequency, for various values of resistor 36. The corresponding characteristics of diode 35 are not shown but are similar to those of diode 34 but rotated 180 degrees about the vertical axis of the figure. The curve for $R_{36}=0$ is representative of the conventional discriminator circuits of the prior art, mentioned above, in which the resistance of the common portion of the two rectifier circuits is either zero or some value very small relative to that of resistors 37 and 38. The other curves for successively increasing values of resistor 36 indicate that diode 34 is cut off at some frequency above the mean frequency of the system but of progressively lower value as the value of $R_{36}$ is increased.

This cutoff is due to the fact that the bias developed across resistor 36 by the current of diode 35 exceeds the peaks of the intermediate-frequency voltage applied to diode 34 so that diode 34 becomes inoperative at these cutoff frequencies. Conversely, in the frequency range between the maximum of the characteristics of diode 34 and the lower frequencies of the operating range, diode 35 is biased to cutoff by the delay bias across resistor 36 developed by diode 34. In the frequency range between the point of maximum response of diode 34 and that of diode 35, each diode is partially delayed by the other, the amount of delay increasing gradually from zero at approximately its own point of maximum response, corresponding approximately to cutoff of the other diode, to a maximum or full cutoff at the approximate point of maximum response of the other diode. This varying delay action is the cause for the progressively increasing slopes of the diode characteristics of Fig. 2 in the vicinity of the intermediate frequency of the receiver, that is, the mean resonant frequency of the system, as the value of resistor 36 is progressively increased. However, this increase in slope does not become appreciable until the value of resistor 36 is of the same order as, or greater than, that of resistors 37 and 38. At the same time, it is noted that the peaks of the diode characteristic fall progressively closer to the mean resonant frequency of the system, thus reducing the range of control. This is probably due primarily to the decreased loading of the tuned circuits of the selector.

In Fig. 3 there are shown characteristic discriminator S curves for the circuit of Fig. 1 for values of resistor 36 varying from zero to 5 megohms, as indicated in the figure, the circuit having the following constants:

Tube 16=type 6K7
Diodes 34 and 35=type 6H6
Inductance 31—882 microhenries
Inductance 32—810 microhenries
Mutual inductance between inductances 31 and 32=4.4 microhenries (K=0.5%)
Q of circuit 30 31=Q of circuit 32, 33=50
Mean frequency of the system $f_0$=450 kilocycles
Condenser 39=10 micro-microfarads
Condenser 40=0.1 microfarad
Resistors 37 and 38=1 megohm each In summary, it is pointed out that the advantages of the discriminator of the invention over the usual type are (1) the peak gain is reduced while the slope of the characteristic in the vicinity of the mean frequency, that is the sensitivity, is improved with respect to the conventional type of discriminator, (2) peak separations of the order of ±1 kc. are obtainable with an intermediate frequency of 450 kc., and (3) the slope of the S curve away from the peak is more uniform and corresponds more closely to that of ordinary control tube characteristics, thereby making the operation of the system, when utilized in an automatic-frequency control, more uniform when tuning toward and away from a signal.

In Fig. 4 there is shown another embodiment of the invention which is similar in operation to that of Fig. 1 and in which corresponding circuit elements have been given identical reference numerals. In the circuit of Fig. 4, the diodes 34 and 35 have been replaced by triode vacuum tubes 44 and 45. The voltage across tuned circuit 30, 31 is applied through a coupling condenser 43 to the cathode-grid circuits of tubes 44 and 45 with the same polarity while one-half the voltage across the circuit 32, 33 is also applied to the control grid-cathode circuits of tubes 44 and 45 but with opposite polarity. One-half of the voltage across the circuit 32, 33 is applied to the anode-cathode circuits of tubes 44 and 45 with opposite polarity. A load circuit is provided for the system comprising series-connected resistors 47, 48 by-passed for alternating currents by condensers 50, 51.

The operation of the circuit of Fig. 4 is generally similar to that of Fig. 1. The vector sum and difference of the voltages of the primary and secondary tuned circuits of the system are applied respectively to the control grid-cathode circuits of tubes 44 and 45, while the voltage of the secondary tuned circuit 32, 33 is applied to the anode-cathode circuits. A voltage is developed across resistor 46 by rectification in the grid-cathode circuits of each of the rectifiers 44 and 45, dependent upon the input signals thereto, and is applied as a delay bias to the other of the rectifiers, thereby effecting an operation similar to that of the circuit of Fig. 1. The bias developed across resistor 46 is double-peaked with respect to frequency. When the receiver is off tune the alternating voltage developed between the cathode and grid of one of tubes 44 and 45 exceeds the bias across resistor 46. This allows the anode-cathode circuit of that triode to be conductive for a small fraction of the cycle. At this time the alternating voltage between the cathode and grid of the other tube is less than the bias developed across resistor 46 and the tube is cut off during the entire cycle. Vacuum tubes 44 and 45 also function as limiters in the circuit of Fig. 4, rendering the output voltage derived from resistors 47, 48 more nearly constant for variations in the signal input to primary circuit 30, 31.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A high-sensitivity frequency-responsive network for operation over a limited frequency range comprising, an input circuit, means coupled to said input circuit for deriving a first voltage, means coupled to said input circuit for deriving a second voltage variable in phase with frequency over said range with respect to said first voltage, two rectifiers, means for applying to one of said rectifiers the sum and to the other of said rectifiers the difference of said two voltages, and means for developing a delay bias for each of said rectifiers from at least one of said sum and difference voltages, each of said biases being sufficient to reduce the output of the rectifier to which it is applied to zero at a frequency in the vicinity of the mean resonant frequency of said range, and means for deriving from said rectifiers an output voltage varying in accordance with the amplitudes and frequency of their corresponding applied voltages.

2. A high-sensitivity frequency-responsive network for operation over a limited frequency range comprising, an input circuit, means coupled to said input circuit for deriving a first voltage, means coupled to said input circuit for deriving a second voltage variable in phase with frequency over said range with respect to said first voltage, two rectifiers, means for applying to one of said rectifiers the sum and to the other of said rectifiers the difference of said two voltages, and means for developing a delay bias for each of said rectifiers from at least one of said sum and difference voltages, one of said biases being sufficient to reduce the output of the rectifier to which it is applied to zero at a frequency slightly above the mean frequency of said range and the other of said biases being sufficient to reduce the output of the rectifier to which it is coupled to zero at a frequency slightly below the mean frequency of said range, and means for deriving from said rectifiers an output voltage varying in accordance with the amplitudes and frequency of their corresponding applied voltages.

3. A high-sensitivity frequency-responsive network for operation over a limited frequency range comprising, an input circuit, means coupled to said input circuit for deriving a first voltage, means coupled to said input circuit for deriving a second voltage variable in phase with frequency over said range with respect to said first voltage, two rectifiers, means for applying to one of said rectifiers the sum and to the other of said rectifiers the difference of said two voltages, means for developing from each of said rectifiers a delay bias for the other, each of said biases being sufficient to reduce the output of the rectifier to which it is applied to zero at a frequency in the vicinity of the mean resonant frequency of said range, and means for deriving from said rectifiers a voltage varying in accordance with the amplitudes and frequency of their corresponding applied voltages.

4. A high-sensitivity frequency-responsive network for operation over a limited frequency range comprising an input circuit, means coupled to said input circuit for deriving a first voltage, means coupled to said input circuit for deriving a second voltage variable in phase with frequency over said range with respect to said first voltage, two rectifiers, means for applying to one of said rectifiers the sum and to the other of said rectifiers the difference of said two voltages, means common to said two rectifiers for developing from each of said rectifiers a bias mutual to said rectifiers, each of said biases being sufficient to reduce the output of the rectifier to which it is applied to zero at a frequency in the vicinity of the mean resonant frequency of said range, and means for deriving from said rectifiers a voltage varying in accordance with the amplitudes and frequency of their corresponding combined voltages.

5. A high-sensitivity frequency-responsive network for operation over a limited frequency range comprising, an input circuit, means coupled to said input circuit for deriving a first voltage, means coupled to said input circuit for deriving a second voltage variable in phase with frequency over said range with respect to said first voltage, two rectifiers, means for applying to one of said rectifiers the sum and to the other of said rectifiers the difference of said first and second voltages, means common to said rectifiers for developing from each of said rectifiers a delay bias mutual to said rectifiers, each of said biases being a major portion of the output voltage of the rectifier from which it is derived, and means for deriving from said rectifiers a voltage varying in accordance with the amplitudes and frequency of their applied voltages.

6. A high-sensitivity frequency-responsive network for operation over a limited frequency range comprising, an input circuit, means coupled to said input circuit for deriving a first voltage, means coupled to said input circuit for deriving a second voltage variable in phase with frequency over said range with respect to said first voltage, two rectifiers each comprising individual load circuits having a common impedance and individual impedances, the value of each of said individual impedances being not substantially greater than that of said common impedance, means for applying the sum of said first and second voltages to one of said rectifiers, means for applying the difference of said first and second voltages to the other of said rectifiers, and means comprising said individual impedances for deriving an output voltage from said system.

7. A high-sensitivity frequency-responsive network for operation over a limited frequency range comprising, an input circuit, means coupled to said input circuit for deriving a first voltage, means coupled to said input circuit for deriving a second voltage variable in phase with frequency over said range with respect to said first voltage, two rectifiers each comprising individual load circuits having a common load resistor and individual load resistors, the value of each of said individual load resistors being not appreciably greater than that of said common resistor, means for applying the sum of said first and second voltages to one of said rectifiers, means for applying the difference of said first and second voltages to the other of said rectifiers, and means comprising said individual impedances for deriving an output voltage from said system.

8. A high-sensitivity frequency-responsive network for operation over a limited frequency range comprising, an input circuit, means coupled to said input circuit for deriving a first voltage, means coupled to said input circuit for deriving a second voltage variable in phase with frequency over said range with respect to said first voltage, two rectifiers comprising individual load circuits having a common load resistor and individual load resistors, the value of said common resistor being at least three times that of each of said individual load resistors, means for applying the sum of said first and second voltages to one of said rectifiers, means for applying the difference of said first and second voltages to the other of said rectifiers, and means comprising said individual load resistors for deriving an output voltage from said system.

9. A high-sensitivity frequency-responsive network for operation over a limited frequency range comprising, an input circuit, means coupled to said input circuit for deriving a first voltage, means comprising two inductively coupled resonant circuits for deriving from said input circuit a second voltage variable in phase with frequency over said range with respect to said first voltage, two rectifiers each comprising individual load circuits having a common impedance and individual impedances, the value of each of said individual impedances being not appreciably greater than that of said common impedance, means comprising a mid-tap on one of said two resonant circuits for applying the sum of said first and second voltages to one of said rectifiers and for applying the difference of said first and second voltages to the other of said rectifiers, and means comprising said individual impedances for deriving an output voltage from said system.

10. A high-sensitivity frequency-responsive network for operation over a limited frequency range comprising, an input circuit, means coupled to said input circuit for deriving a first voltage, means coupled to said input circuit for deriving a second voltage variable in phase with frequency over said range with respect to said first voltage, two rectifiers comprising individual load circuits having a common impedance and individual impedances, the value of each of said individual impedances being appreciably smaller than that of said common impedance, means for applying the sum of said first and second voltages to one of said rectifiers, means for applying the difference of said first and second voltages to the other of said rectifiers, and means comprising said individual impedances for deriving as an output voltage the algebraic sum of the voltages across said individual impedances.

11. A high-sensitivity frequency-responsive network for operation over a limited frequency range comprising, an input circuit, means coupled to said input circuit for deriving a first voltage, means coupled to said input circuit for deriving a second voltage variable in phase with frequency over said range with respect to said first voltage, two vacuum-tube rectifiers each having input and output electrodes, means for applying to the input electrodes of one of said rectifiers the sum, and to the input electrodes of the other of said rectifiers the difference, of said first and second voltages, means comprising a grid-bias resistor for said tubes common to the input circuits of said tubes for developing a delay bias from the input electrodes of each of said tubes and applying it to the input electrodes of the other of said tubes, each of said biases being sufficient to reduce the output of the rectifier to which it is coupled to a low value in the vicinity of the mean resonant frequency of said range, and means for deriving from said rectifiers a voltage varying in accordance with the amplitudes and frequency of their applied voltage.

12. A high-sensitivity frequency-responsive network for operation over a limited frequency range comprising, an input circuit, means coupled to said input circuit for deriving a first voltage, means coupled to said input circuit for deriving a second voltage variable in phase with frequency over said range with respect to said first voltage, two rectifiers, means for applying to one of said rectifiers the sum and to the other of said rectifiers the difference of said first and second voltages, and means for developing a delay bias for each of said rectifiers from at least one of said sum and difference voltages, each of said biases being sufficient to reduce the output of the rectifier to which it is applied to a low value in the vicinity of the mean frequency of said range, said rectifiers comprising means for limiting their outputs to relatively uniform values for a wide variation of the amplitude of the signal input to the system, and means for deriving from said rectifiers a voltage varying in accordance with the amplitudes and frequency of their applied voltages.

ROBERT L. FREEMAN.